Sept. 30, 1969               G. REUSCH               3,470,049
METHOD OF ENCAPSULATING REACTIVE LAYER
EXHIBITING REVERSIBLE VARIABLE
LIGHT PERMEABILITY
Filed Aug. 17, 1965

INVENTOR.
GOTTHILF REUSCH
BY
M<sup>c</sup>Glew & Toren
ATTORNEYS.

United States Patent Office 3,470,049
Patented Sept. 30, 1969

3,470,049
METHOD OF ENCAPSULATING REACTIVE LAYER EXHIBITING REVERSIBLE VARIABLE LIGHT PERMEABILITY
Gotthilf Reusch, Berkheim, Germany, assignor to J. Eberspacher, Esslingen, Neckar, Germany
Filed Aug. 17, 1965, Ser. No. 480,455
Claims priority, application Germany, Aug. 18, 1964, E 27,629
Int. Cl. B32b 1/06
U.S. Cl. 156—145     1 Claim

ABSTRACT OF THE DISCLOSURE

A method of producing a multilayer construction having a reactive layer which exhibits reversible variable light permeability. The light permeability varies in dependence on temperature and light conditions and the reactive layer is interposed between outer transparent layers which have marginal portions which extend beyond and encompass the reactive layer. The construction is carried out by placing the outer panels in parallel spaced planes in a manner such that their marginal portions register. Two cores are placed at spaced locations between the outer panels and they are located transverse to the marginal portions. The marginal portions are then urged into a unitary integral sealing rim portion except at the location of the two cores. The rim portion encompasses an interior cavity formed by the panels. Thereafter, the cores are removed and two spaced passages which traverse the sealing rim portion remain which establish connection between atmosphere and the interior of the cavity. A reactive layer is then introduced through one of the passages and the air within the cavity escapes through the other passage. Thereafter, the passages are hermetically sealed.

SUMMARY OF THE INVENTION

This invention generally relates to self-shading light transmitting multi-layer constructions of the kind wherein a reactive layer, which exhibits reversibly variable light permeability in dependence on temperature and light conditions, is interposed between transparent panels or is accommodated in an interior cavity formed by enclosing envelope means. Multi-layer constructions and reactive layers of the indicated kind have become known in varying embodiments and reference is had, for example, to U.S. Patent No. 2,710,274 and U.S. patent applications 455,938 (now abandoned) and 207,116 now Pat. No. 3,244,582 granted on Apr. 5, 1966. Such multi-layer constructions have reversibly self-shading characteristics and, under the influence of radiation in the visible optical frequency range and in the thermal range, change their light transmission characteristics, either by becoming increasingly opaque due to such radiation or by undergoing a change of color. If such multi-layer constructions in their transparent state are thus subjected to sunlight, they tend to assume an opaque condition or they may change their color.

As is well known in the art, the reaction mechanism which causes the reversibly variable light permeability of the reactive layer of the multi-layer construction is greatly dependent on the water content and the water distribution within the layer structure. If the amount of water within the reactive layer decreases below a permissible value, the desired reversibility of the light transmission characteristics does no longer take place. For this reason, care has to be taken to hermetically seal the reactive layer within the panels between which the reactive layer is interposed so as to prevent evaporation and thus loss of water. In prior art constructions of the kind with which this invention is concerned, the reactive layer is customarily interposed between two cover panels or sheets, such as of silicate glass or certain plastics, the marginal portions of these panels or sheets being hermetically sealed in order to prevent loss of moisture from the reactive layer.

In considering the manufacture of such multi-layer constructions, it must be appreciated that the viscosity of the reactive layer in the final product is almost zero or infinitely large. In both instances, the reversibility is caused by the action of heat, whereby the reactive layer, corresponding to its viscosity state, either is reversibly converted from the sol state to the gel state or in conjunction with water or aqueous salt solutions assumes an optically heterogeneous condition. The temperature dependent reaction point is, however, always dependent on the water content of the reactive layer. If the ratio water:dry content of the reactive layer is changed to an impermissible extent then the reaction point may be displaced to such a degree that the reactive layer becomes inoperative. For this reason, hermetic sealing of the reactive layer within the panel structure is of paramount importance.

In the customary prior art manufacturing processes, the reactive layer is applied to the central area of a transparent supporting panel or sheet without, however, covering the marginal portions of the supporting panel. A transparent cover panel is then placed on the reactive layer whereafter the free marginal area of the supporting panel is filled with a hardenable resin, to bond with the panels and to seal the reactive layer within the panel structure. This prior art procedure is time consuming and expensive. Moreover, the multi-layer constructions obtained in this manner have certain disadvantages and a limited use only. Thus, for example, if a multi-layer construction obtained by this prior art procedure is subjected to significant temperature fluctuations, cracks may form in the panels particularly in the marginal regions thereof where the bonding with the resin is effected, thereby enabling moisture contained in the reactive layer to escape either in the form of condensate water or water vapor.

It is a primary object of this invention to overcome the drawbacks of the prior art constructions and methods and to provide a multi-layer construction of the kind referred to which has superior characteristics, is of rugged and inexpensive design and is readily and inexpensively manufactured.

Another object of this invention is to provide a multi-layer construction of the indicated kind wherein the reactive layer is effectively sealed within cover panels but wherein at the same time access to the reactive layer can be had without destroying the multi-layer structure.

Another object of this invention is to provide for a new method of manufacturing multi-layer constructions of the indicated kind, which is simple to carry out in an inexpensive manner.

Generally, it is an object of this invention to improve on the art of multi-layer constructions containing layers of reversibly variable light permeability, as presently practiced.

Briefly, the multi-layer construction of this invention comprises a reactive layer, which exhibits reversibly variable light permeability in dependence on temperature and light conditions, which layer is interposed between first and second transparent panels. The transparent panels have marginal portions which extend beyond and encompass the reactive layer. The marginal portions of these first and second transparent panels are fused or united toegther to form a unitary integral sealing rim which rim has at least two spaced openings or passages which transversely traverse the rim to establish communication between the reactive layer and the ambient atmosphere. These openings or passages are hermetically closed when the mulit-layer construction is to be used, but are open during the manufacture of the construction to enable the introduction of the material which forms the reactive layer interposed between the panels.

The multi-layer construction is adavntageously of rectangular or square shape and the passages or openings may be located adjacent diagonally opposing corners of the structure which facilitates the introduction of the reactive layer forming materials into the structure.

The passages may be interiorly threaded in order to mesh with exteriorly threaded screw plugs or bolts for closing the passages. Washers or the like sealing means may be interposed between the screw plugs and the walls defining the passages. The threads of the passages may be integrally formed in the material of the panels, which may be glass or a suitable plastic or the passages may be lined with interiorly threaded sleeves which are fused or bonded to the rim material. In the latter case, exteriorly threaded screw plugs can then be screwed into the sleeves to close the structure.

The marginal portions of the two panels may be united by a heating or molding process, whereby the marginal portions are softened and then pressed together to fuse and to form an integral unitary rim portion. The heating should be effected to a temperature at which the material of the marginal portions of the panels starts to flow or become plastic. This procedure is particularly advantageous if the panels are made of glass. If the panels are made of plastic, the marginal portions may be softened by a suitable solvent whereafter the softened marginal portions are compressed to form the unitary rim.

In order to form the passages in the construction, cores may be placed between the panels and across the marginal portions of the panels where the passages are to be formed. When the marginal portions of the panels are united, passages are then formed around the cores. If the cores have an exterior thread, an interior thread will thus be impressed into the material during the bonding or fusing operation. Upon withdrawal of the cores, permanent passages are thus formed in the rim portion. The cores may later be used as closing means for closing the structure. It is, however, feasible to press hollow, interiorly threaded sleeves into the rim portion at those areas where the passages are to be formed. Suitable screw plugs or the like may then be screwed into these sleeves. Of course, more than two openings or passages may be formed.

The united panels with their joint rim define an interior cavity which, when the passages are open, communicates with the ambient atmosphere through the passages which traverse the rim. The material which forms the reactive layer is then introduced into this cavity through the passages. This may be accomplished in different ways. For example, a liquid containing the material which forms the reactive layer may be injected through one of the passages with the other passage acting as venting means. The introduction of the liquid can be carried out under pressure or a pump may be attached to one of the passages to exhaust the air within the interior cavity while at the same time the liquid reactive layer forming material is sucked into the cavity through the other passage. It is also feasible to dip the united panel structure into a bath which contains the reactive layer forming materials so that one of the passages is immersed within the bath while the other passage is above the bath level. In this manner, liquid is forced into the cavity with air escaping through the passage above the bath. One of the passages should, of course, always be able to act as a venting or exhaust means. If the passages are located adjacent diagonally opposed corners of the structure the venting passage may be arranged to be at a higher level by tilting the panel structure accordingly.

If liquid is to be removed from the reactive layer forming material after it has been introduced into the cavity, the panel structure may be heated to cause evaporation of liquid until the desired viscosity of the reactive layer has been obtained, whereupon both passages are hermetically closed.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
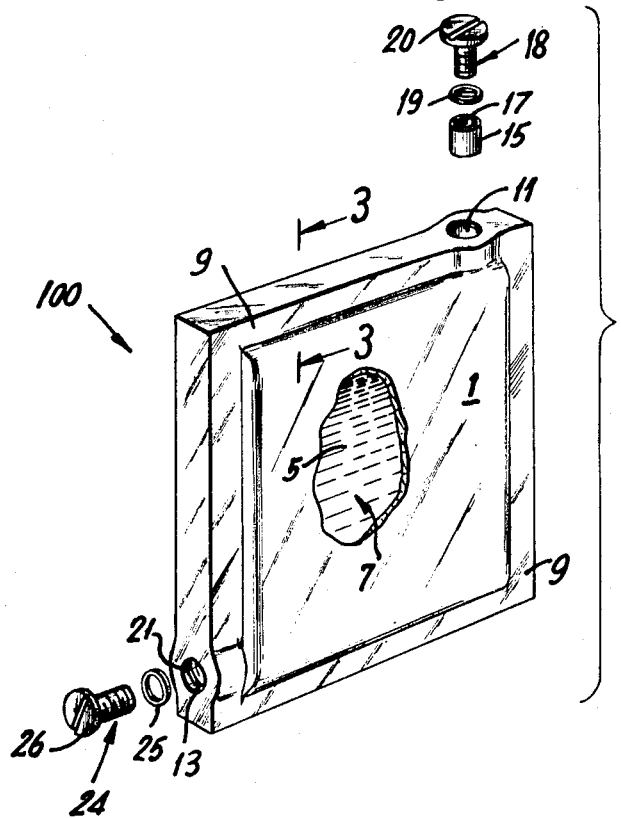
FIG. 1 is a perspective partially exploded view of one embodiment of a multi-layer construction in accordance with this invention.
Figure 3:
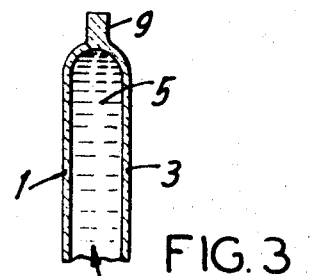
FIG. 3 is a section along the line 3—3 of FIG. 1.
Figure 2:
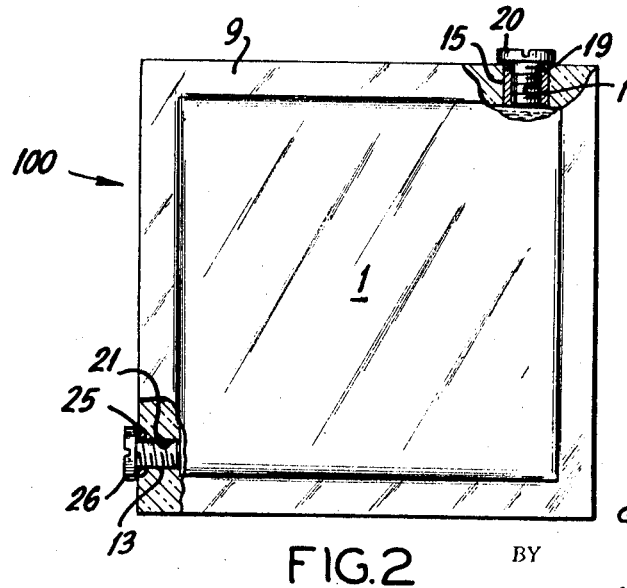
FIG. 2 is a plan view, partially in section of the embodiment corresponding to FIG. 1.

Referring now to the drawings, a multi-layer construction generally referred to by reference numeral 100 comprises two parallel spaced panels 1 and 3 which are joined together along a unitary integral rim portion 9 common to both panels. The rim portion 9 has been formed by uniting the marginal portions of the panels 1 and 3 as by fusing. Two passages 11 and 13 traverse the rim portions 9. It will be noted that the general configuration of the structure is essentially square and that the passages 11 and 13 are located adjacent diagonally located corners of the square. The panels 1 and 3 with the circumferentially extending rim portion 9 encloses an interior cavity 7 which is filled with a reactive layer 5 which exhibits reversibly variable light permeability in dependence on temperature or light conditions. The passages 11 and 13 extend through the rim 9 to the cavity 7. A cylindrical sleeve 15, shown in FIG. 1 in exploded view is fitted into the passage 11 and hermetically sealed against the wall thereof as by fusing. The sleeve 15 is interiorly threaded as seen at 17 to mesh with an exteriorly threaded screw plug 18. A washer 19 is interposed between the head 20 of the screw plug 18 and the sleeve 15 in order to provide for an effective seal when the plug 18 is screwed into the sleeve 15.

Passage 13 has an interior thread 21 which meshes with the exterior thread 22 of a screw plug 24. Washer 25 is interposed between the head 26 and the rim portion 9 when the screw plug 24 is screwed into the passage 13.

The multi-layer construction 100 hereinabove described, is manufactured as follows.

Two transparent glass panels, to wit, the panels 1 and 3 are first placed in parallel spaced planes with the marginal portions of the panels in register. This may be accomplished by inserting one of the panels into a mold having a mold cavity whose configuration essentially conforms to that of the panel. Cores are then placed on this panel at the locations where the passages 11 and 13 are to be formed. The screw plug 24 may be one of the cores while the sleeve 15 may be the other one. The second panel is then placed on the first panel and the marginal portions of the panels are softened by heat whereupon the softened marginal portions are compressed to form the rim portion 9. Due to the provision of the tranversely extending cores, the marginal portions will not be joined where the cores are located. If the core for passage 13 is the screw plug 24, the screw plug can be unscrewed from the rim portion 9 after solidification and cooling of the rim portion. The exterior threads 22 of the core 24 will thus have formed the interior threads 21 in the glass. The core for the passage 11, which as previously mentioned may be in the form of the sleeve 15 fuses to the glass material during the compression action. It will be appreciated, however, that the passages 11 and 13 may be formed in different manner. For example, it is not necessary to use the screw plug 24 of the sleeve 15, but other core members could be employed which thereafter are removed. The cores or plugs may be of glass, particularly if they are used as closing means. In this manner, the plugs will have the same expansion coefficient as the panels.

If the panels are of plastic, the rim portion 9 may be formed in a different manner by softening the marginal portions of the panels with a suitable solvent and thereafter compacting the softened marginal portions into the rim.

Once the rim portion 9 has been formed, it defines in conjunction with the panel surfaces 1 and 3 the interior cavity 7 into which the material forming the reactive layer 5 has to be filled. This may be accomplished in different manner. For example, upon removal of the screw plugs 24 and 18, the panel structure may be dipped into a bath so that the passage 13 is within the bath while passage 11 is above the bath so that air can escape through the latter passage. Passage 11 therefore acts as a vent. In order to facilitate the injection of the material which forms the reactive layer 5 into the interior cavity 7, vacuum may be applied to the passage 11 while at the same time the reactive layer forming liquid is introduced through passage 13. This may be accomplished by attaching the hose of a pump to the passage 11, and then actuating the pump thereby to exhaust the air within the cavity. If the hose has a terminal screw plug which meshes with the threads 17 of the sleeve 15, ready attachment can, of course be accomplished. The liquid material may also be positively pumped or forced into the cavity 7. Once the reactive layer forming material has been inserted, passage 13 is closed by the screw plug 24, and the panel structure is placed on edge so as to prevent the liquid from flowing out. In other words, the panel structure should be placed so that the passage 11 assumes the highest position. If excess liquid or diluent has to be removed, the entire structure may be heated to cause evaporation of liquid through the passage 11 until the desired viscosity degree of the material within the interior cavity has been obtained. The screw plug 20 is thereupon screwed into the sleeve 15, whereupon the multi-layer structure is ready for use.

What is claimed is:
1. A method of producing a multi-layer construction of the kind wherein a reactive layer which exhibits reversibly variant light permeability in dependence on temperature and light conditions is interposed between first and second transparent panels having marginal portions which extend beyond and encompass said reactive layer, said method comprising
   (a) placing said first and second panels in parallel spaced planes with the marginal portions of the panels in register;
   (b) placing two cores at spaced locations between the panels transverse to the marginal portions,
   (c) thereafter urging the marginal portions into a unitary integral sealing rim portion except at the location of said two cores,
   (d) said rim portion encompassing an interior cavity formed between the panels, thereafter removing the cores, whereby two spaced passages traversing said sealing rim portion and establishing communication between the ambient atmosphere and the interior cavity are obtained,
   (e) then introducing reactive layer forming material in liquid form through one of said passages, whereby air within said interior cavity escapes through the other one of said passages,
   (f) and then hermetically closing said passages.

References Cited

UNITED STATES PATENTS

| | | | |
|---|---|---|---|
| 2,359,163 | 9/1944 | Sherts | 156—99 XR |
| 2,501,418 | 3/1950 | Snowden. | |
| 2,549,513 | 4/1951 | Nicolle | 156—294 XR |
| 2,710,274 | 6/1955 | Kuehl | 161—410 XR |
| 2,768,106 | 10/1956 | Sartakoff | 156—293 XR |
| 3,280,701 | 10/1966 | Donnelly et al. | 350—321 XR |
| 3,350,553 | 10/1967 | Cline | 161—45 XR |

ROBERT F. BURNETT, Primary Examiner

WILLIAM A. POWELL, Assistant Examiner

U.S. Cl. X.R.

53—29, 37; 156—245, 305, 306; 161—45, 410; 264—248, 255; 350—160, 312